United States Patent

Ulrich et al.

[11] Patent Number: 6,036,135
[45] Date of Patent: Mar. 14, 2000

[54] WINDING OF COILS INTO AXIAL SLOTS IN ROTATIONALLY SYMMETRIC BODIES OF ELECTRICAL DEVICES

[75] Inventors: Peter Ulrich, Rudolfstetten; Siegfried Zihlmann, Würenlos; Thomas Bolli, Klingnau, all of Switzerland

[73] Assignee: ATS Automation Tooling System Inc., Cambridge, Canada

[21] Appl. No.: 09/079,479

[22] Filed: May 15, 1998

[30] Foreign Application Priority Data

May 16, 1997 [EP] European Pat. Off. ............... 97810305

[51] Int. Cl.$^7$ .................................................... H02K 15/09
[52] U.S. Cl. .......................................... 242/433.1; 29/596
[58] Field of Search .............................. 242/433.3, 433.4, 242/433.1, 433.2; 29/596, 598

[56] References Cited

U.S. PATENT DOCUMENTS

| | | | |
|---|---|---|---|
| 605,154 | 6/1898 | Wait | 242/433.4 |
| 2,810,848 | 10/1957 | Roberts | 242/433.4 |
| 3,098,616 | 7/1963 | Eminger . | |
| 3,506,864 | 4/1970 | Miller . | |
| 3,713,598 | 1/1973 | Bucholtz et al. . | |
| 3,927,456 | 12/1975 | Dammar . | |
| 3,942,246 | 3/1976 | Wilding | 242/433.4 |
| 3,973,738 | 8/1976 | Miller . | |
| 4,174,815 | 11/1979 | Dammar . | |
| 4,289,281 | 9/1981 | George et al. | 242/433.4 |
| 4,520,965 | 6/1985 | Kimura et al. . | |
| 4,765,551 | 8/1988 | Page et al. . | |
| 4,786,004 | 11/1988 | Boers . | |
| 4,928,894 | 5/1990 | Ohno et al. . | |
| 5,025,997 | 6/1991 | Shi et al. . | |
| 5,064,128 | 11/1991 | Iwase . | |
| 5,257,745 | 11/1993 | Lombardi et al. . | |
| 5,383,620 | 1/1995 | Lombardi et al. . | |
| 5,413,289 | 5/1995 | Santandrea et al. . | |
| 5,484,114 | 1/1996 | Santandrea et al. . | |
| 5,596,796 | 1/1997 | Ruoss . | |

FOREIGN PATENT DOCUMENTS

| | | |
|---|---|---|
| 0 526 819 A2 | 2/1993 | European Pat. Off. . |
| 0 578 009 A1 | 1/1994 | European Pat. Off. . |
| 0 703 658 A1 | 3/1996 | European Pat. Off. . |
| 1924850 | 1/1970 | Germany . |
| 59-017851 | 1/1984 | Japan . |

Primary Examiner—Katherine A. Matecki
Attorney, Agent, or Firm—R. Craig Armstrong

[57] ABSTRACT

In a process for the winding of coils into axial slots disposed on the outer perimeter of rotationally symmetric bodies of electrical devices, at least one wire, guided by a winding arm movable about an axis of rotation perpendicular to the axis of rotation of the body, is laid into the slots via a winding form. The body is turned about its axis of rotation by the space of at least one slot after each laying of the wire into an initial slot, accomplished by an initial swinging motion of the winding arm about its axis of rotation, with the wire being laid into a second slot by a second swinging motion opposite to the first and guided back to the start of the first slot after the laying into the second slot for the formation of a coil winding by additional turning. A suitable winding form has a wire-guiding slit that ends in an undercut slot whose undercut surfaces fix the wire on the base of the slot until the completion of the following swinging motion of the winding arm.

17 Claims, 5 Drawing Sheets

WINDING OF COILS INTO AXIAL SLOTS IN ROTATIONALLY SYMMETRIC BODIES OF ELECTRICAL DEVICES

BACKGROUND OF THE INVENTION

The invention relates to a process for the winding of coils into axial slots disposed on the outer perimeter of rotationally symmetric bodies of electrical devices, whereby at least one wire guided by a winding arm movable about an axis of rotation is laid into the slots via a winding form. Apparatus suitable for the implementation of the process also lies within the scope of the invention.

For the winding of coils in the case of collector armatures, laying in of the wire, via rotating winding arms, into axial slots pairwise opposite to one another is known in the art. As soon as a coil is completely wound, the armature is turned about its axis of rotation for the winding of the next coil so that the pair of slots taking up the next coil is in the winding position with respect to the winding arm. The introduction of the wire by the rotating winding arms is accomplished via so-called winding forms that serve as an aid to the laying into the slots of the wire to be laid.

A process as well as an apparatus of the type mentioned previously are, for example, disclosed in EP-A-0 703 658. A significant disadvantage of these prior art winding methods with rotating winding arms lies in their practically permitting only coil windings in axial slots diametrically opposite one another.

In the case of the stators of so-called electronic motors, the individual coils are each wound about a sheet metal tooth of the stator, that is, the wire of a coil winding is laid into axial slots neighboring one another. This type of winding could not be machined in a simple way until now.

SUMMARY OF THE INVENTION

The objective of the present invention is to create a winding process of the type mentioned previously, as well as a winding apparatus suitable for the implementation of the process with which coils can also be wound about individual teeth or studs.

With regard to the process, the body being turned about its axis of rotation by the space of at least one slot after each laying of the wire into an initial slot accomplished by an initial swinging motion of the winding arm about its axis of rotation, and the wire being laid into a second slot by a second swinging motion opposite to the first and guided back to the start of the first slot after the laying into the second slot for the formation of a coil winding by additional turning of the body, leads to the realization of the objective according to the invention.

The term "wire" along with an individual wire, also includes several wires that are laid into the slots simultaneously for the winding of a multisection coil.

By the combination of a swinging motion of the winding arm, followed by a turning of the body, it is possible to lay the windings of a coil into slots directly neighboring one another, that is, to wind the coils about individual teeth or studs separated by slots. Although this process is particularly suitable to the winding of a coil about an individual tooth, winding of pairs of slots further removed from one another is of course also possible.

An initial apparatus suitable for the implementation of the process according to the invention includes an apparatus for chucking and wiring of the body to be wound by the space of at least one slot, at least one winding arm for guiding of the wire, and at least one winding form as an aid for laying of the wire to be laid into the slots. According to the invention the winding form has a wire-guiding slit with at least one retaining surface disposed transverse to the plane of the slit that serves for temporary fixation of the wire on the base of the slot during the swinging motion of the winding arm.

In the case of a preferred form of embodiment of the first apparatus according to the invention, the wire-guiding slit of the winding form ends in an undercut slot whereby the undercut surfaces form the retaining surfaces mentioned previously.

Expediently, the winding form is formed in a U-shape in cross section, with a base part and two leg portions projecting out from it while the wire-guiding slit ends in the two leg portions, each in an undercut slot. Thereby the base of the undercut slot preferably forms one oblique surface, extending the slot against the outer side of the leg portions.

So that the wires do not obstruct at high windings, in the case of a preferred form of embodiment the winding form is disposed so that it can be moved radially with respect to the body.

A second apparatus suitable for the implementation of the process according to the invention includes an apparatus for chucking and wiring of the body, at least one winding arm for guiding of the wire, and at least one winding form as an aid for laying in of the wire to be laid into the slots, whereby the winding forms form a slit for guiding of the wire. According to the invention, on both sides of the winding forms two catching elements rigidly connected to one another are disposed for retaining the wire in the slot during the swinging motion of the winding arm whereby the catching elements can be brought, against the force of a spring element, into an open position by the wire to be laid into the slot during the laying process. After successful laying of the wire into the slot, these catching elements are spontaneously retractable, by the force of the spring element, into a closed position transverse to the plane of the slit.

In a preferred form of embodiment of the second apparatus according to the invention, the catching elements are formed as safety catches and can be swung about a common axis of rotation from the open position into the closed position.

Expediently, the safety catches are affixed at both ends of a pin rotatably positioned in one of the winding forms.

The spring element is, in the simplest case, a spring engaging at the catching element, for example, in the form of a helical or plate spring made of steel. A preferred spring element is a pneumatic cylinder. By the setting of an appropriate air pressure in the pneumatic cylinder, the force acting on the safety catches can be set in a simple manner.

In the case of the second apparatus according to the invention the movement of the two catching elements into the open position is done directly by the wire itself during the laying into the slot, that is, a forced control of the catching elements is accomplished by the laying of the wire into the slot. Immediately after the wire has passed the catching elements and is laid into the slot, the catching elements are retracted by the force of the spring element into the closed position. The point in time of the closing and opening process can be set to optimal winding conditions by the position of the winding arm relative to the body, as well as by an appropriately chosen spring force. Complex control of the mechanics is eliminated by the retaining apparatus with catching elements, which work spontaneously.

All prior-art rotors and stators for electrical motors and generators can be wound using the process and apparatus according to the invention, in which the winding coils are laid into axial slots disposed on the outer perimeter of the stators or rotors. A particular area for use relates to the application of coils about individual or multiple teeth in stators of so-called electronic motors.

BRIEF DESCRIPTION OF THE DRAWINGS

Other advantages, characteristics, and details of the invention will be evident from the following description of preferred embodiment examples, as well as with the aid of the drawings, in which.

DETAILED DESCRIPTION

Figure 1:
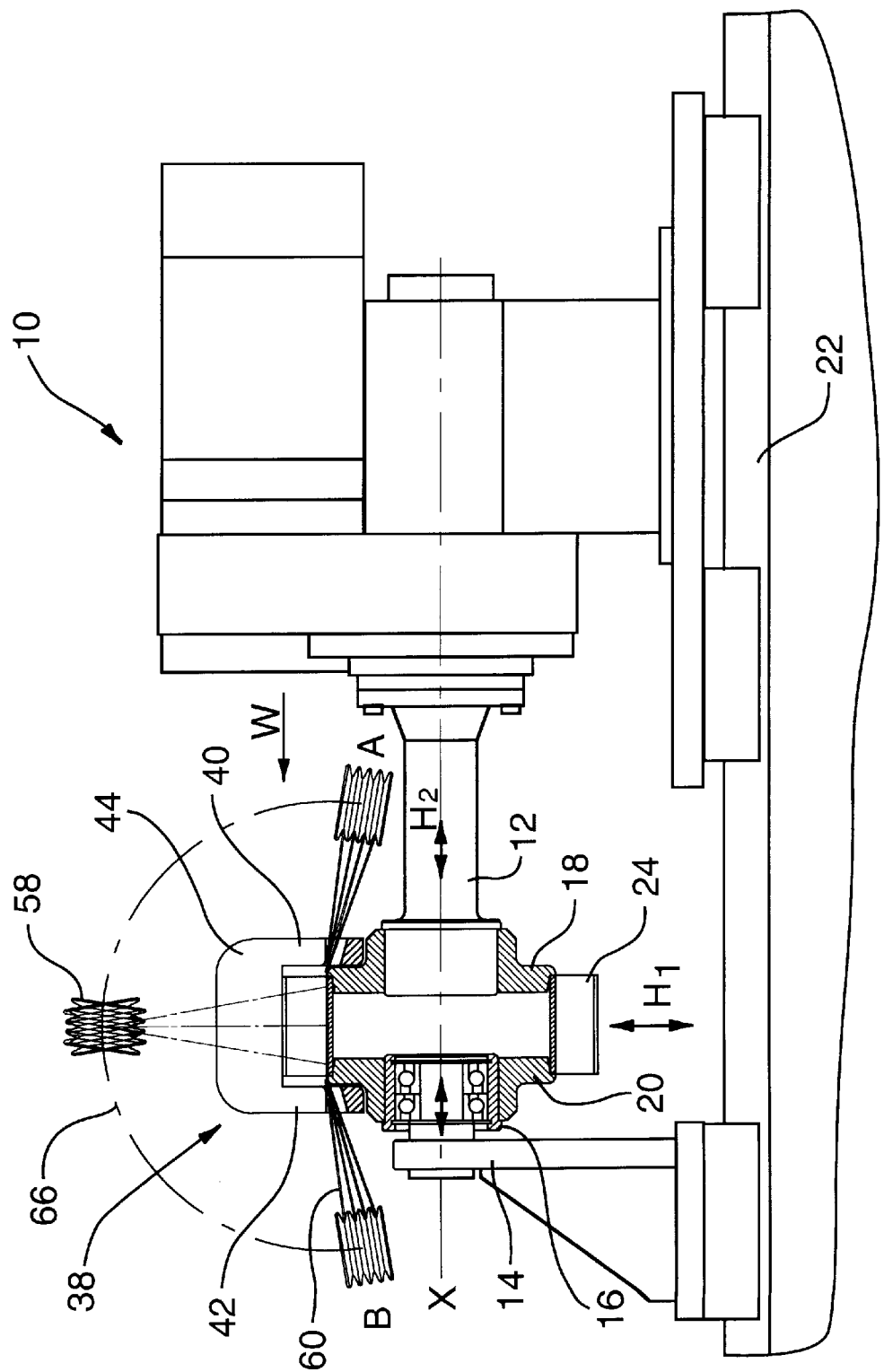
FIG. 1 is a partially cutoff lateral view of an initial embodiment example of a winding machine.
Figure 2:
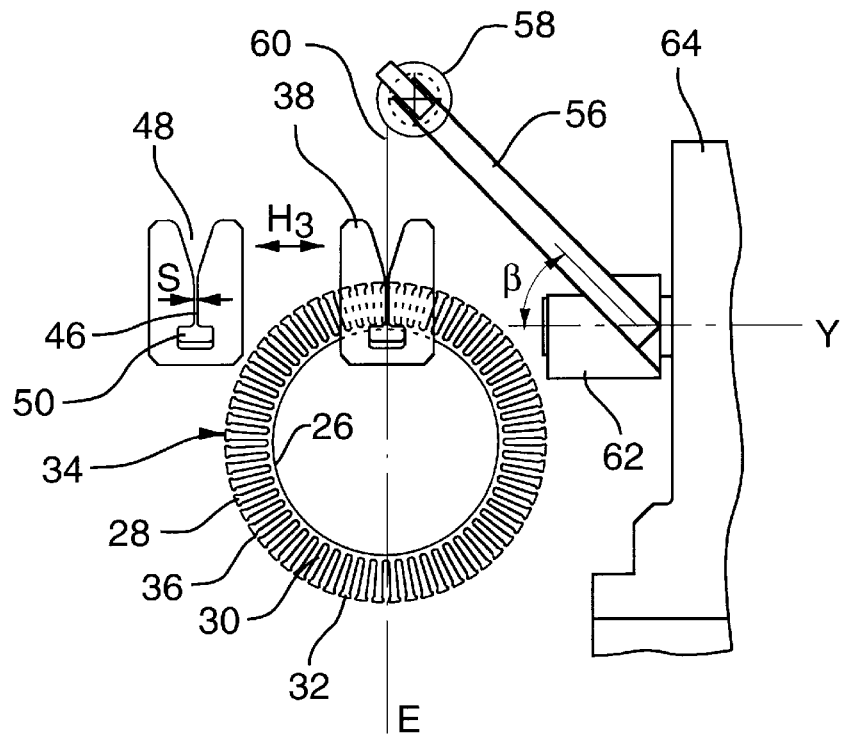
FIG. 2 is a partial view of the winding machine from FIG. 1 viewed from the direction w.
Figure 3:
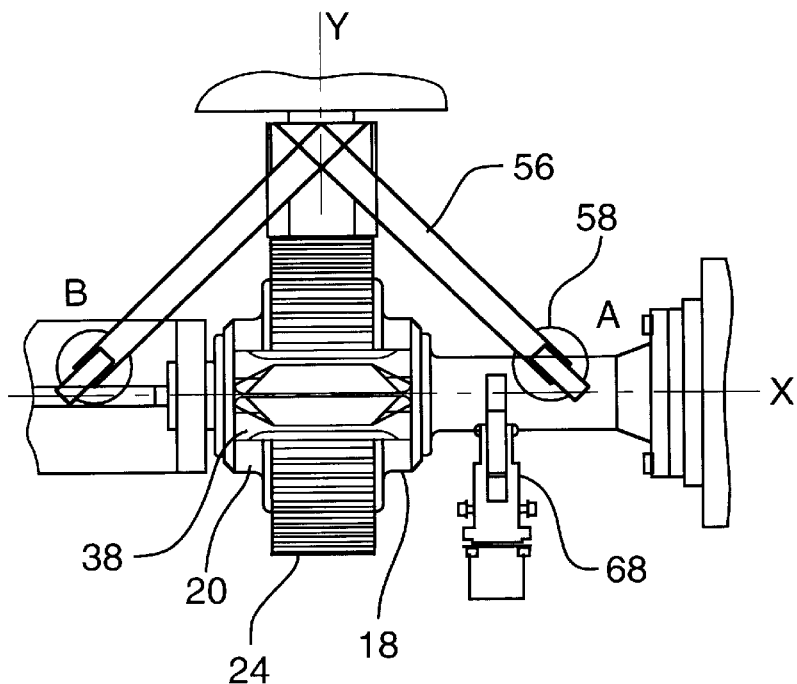
FIG. 3 is a plane view of a part of the winding machine from FIG. 1.

An initial form of embodiment of a winding machine represented in FIGS. 1–3 includes a wiring apparatus 10 with an initial chucking tool 12 as well as a counterbearing 14 with a second chucking tool 16 mounted in a freely rotatable manner thereon.

Wiring apparatus 10 and counterbearing 14 are movably disposed on tracks 22. On the chucking tools 12, 16 are set take-up parts 18 or 20 that, for the chucking of an intermediately disposed stator 24, are driven into its bore.

The stator 24 chucked between the two take-up parts 18, 20 is rotatably chucked about its axis of rotation x, which corresponds to the chucking axis of wiring apparatus 10 and counterbearing 14.

The stator 24, shown an external rotor in the example, essentially consists of a ring 26 with teeth 28 projecting radially outward from it and which form axial slots 30 as slits for the take-up of a wire coil. The individual teeth 28 of the stator 24 have a free end 32 that is somewhat T-shaped in cross section. The free ends 32 of the teeth 28 form, interrupted by opening slits 36 of the axial slots 30 for the introduction of wire, the external surface 34 of the stator 24.

A winding form 38, somewhat U-shaped in cross section, includes a base part 44 from which two leg portions 40, 42 project. A wire-guiding slit 46 of width s, which corresponds approximately to the width of the opening slits 36 of the axial slots 30, passes through the base part 44, as well as partially through the two leg portions 40, 42, and ends in an undercut slot 50 in each of these.

The undercut slot 50 in each of the two leg portions 40, 42 has two undercut surfaces 52 that, as explained further below, serve as retaining surfaces for the temporary fixation of the wire during the winding process. The base 54 of the slot 50 forms an oblique surface so that the slot 50 is extended against the outer side of the leg portions 40, 42.

During the winding process, the winding form 38 is disposed over the stator 24 so that the two leg portions 40, 42 reach over the stator 24, with the wire-guiding slit 46 coinciding with each axial slot 30 to be wound. As an aid to the introduction for the wire to be introduced into the winding form 38, the base part 44 is provided with an extension 48 that is essentially V-shaped in cross section.

The winding of the stator 24 is done with a winding wire 60 via a winding arm 56 that is disposed at an angle β with respect to the axis of rotation y on the axis shaft 62 of a drive unit 64.

The winding wire 60, which can consist of several wires for the winding of a multisection coil, is guided over a wire-guiding roll 58 that is disposed at the free end of the winding arm 56 and during the swinging motion of the winding arm 56, that lies in the slit plane E defined by the wire-guiding slit 46 in the winding form 38 in which the axial slot 30 to be wound also lies. In the present example, the wire-guiding roll 58 is formed for the winding of a multisection coil with four wires.

The winding arm 56 or its wire-guiding roll 58 describes, in its swinging motion, a circular arc 66 lying in the plane E of the slit between two terminal positions A and B. The angle of swing α between the two terminal positions A and B is somewhat more than 180°.

The process according to the invention, or the function of the first form of embodiment of the apparatus according to the invention, is explained in more detail in the following with the aid of FIGS. 4–8.

Figure 4:
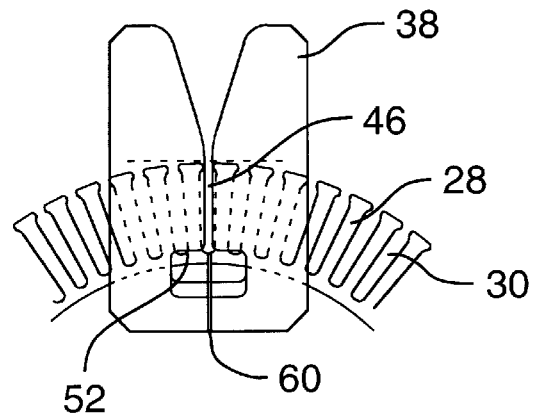
FIGS. 4–6 are frontal views of the winding form from FIG. 1 in various stages of winding.
Figure 7:
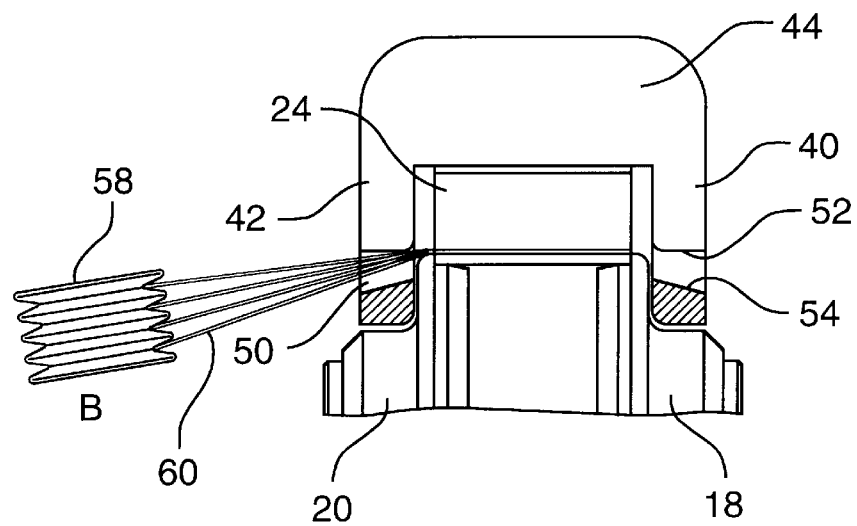
FIG. 7 is a partially cutoff lateral view of the arrangement from FIG. 4.

At the beginning of the winding process, the free end of the winding wire 60 is fixed by means of a wire clamp 68 indicated in FIG. 3. By an initial swinging motion of the winding arm 56 from an initial terminal position A into a second terminal position B, the winding wire 60 is laid into an initial axial slot 30 (FIGS. 4 and 7).

Figure 5:
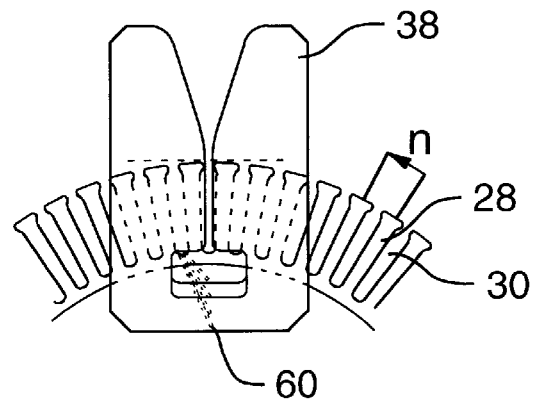

After the winding arm 56 has reached its second terminal position B, the stator 24 is turned via the wiring apparatus 10 by the space of one slot n. During this turning, the undercut surface 52 of the undercut slot 50 is shifted over the winding wire 60 extending laterally from the axial slot 30 so that it is held on the base of the slot (FIG. 5).

Figure 6:
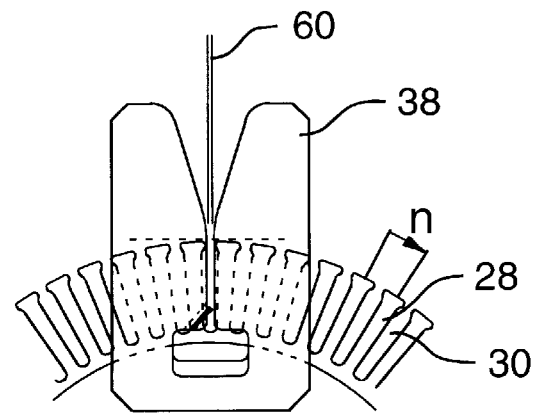
Figure 8:
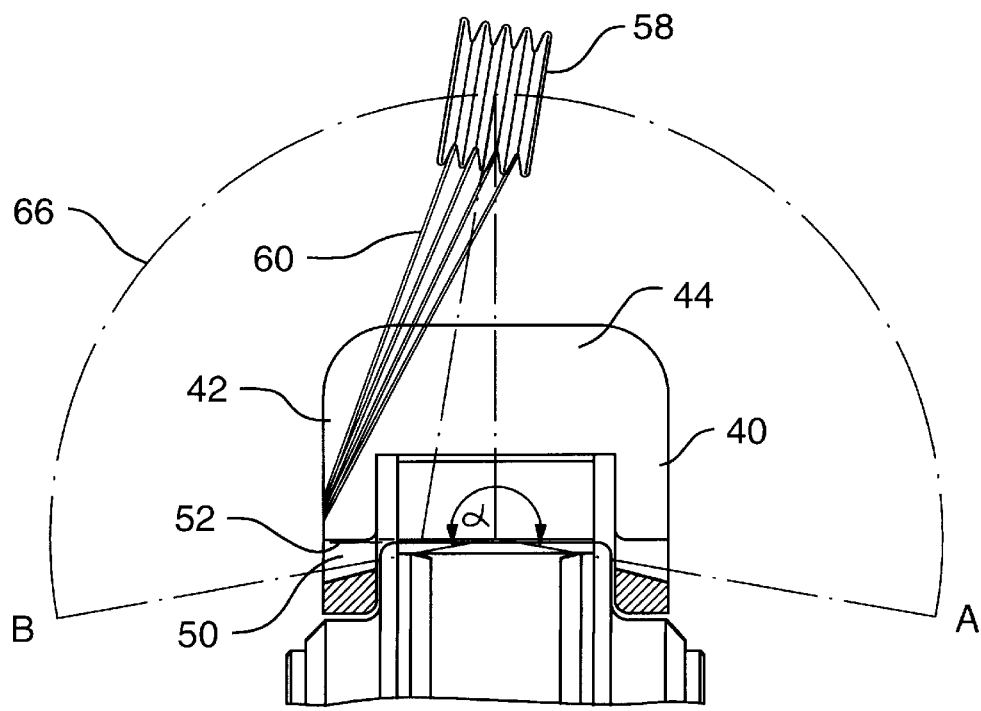
FIG. 8 is a partially cutoff lateral view of the arrangement from FIG. 5.

During the following swinging motion of the winding arm 56 from the second terminal position B back into the first terminal position A, the winding wire 60 is thus held down on one side by the winding form 38 and finally only slips into the axial slot 30 when the winding arm 56 has once again reached the first terminal position. FIGS. 6 and 8 show the position of the winding wire 60 during the swinging motion of the winding arm 56 between the two terminal positions A and B. The winding wire 60, held fixed on the base of the slot by the undercut surface 52 in this phase of the winding process, stretches over the outer side of the leg portion 42 in the region of its corner bounded by the undercut surface 52 and the wire-guiding slit 46. After successful laying of the winding wire 60 into the slot 30, the stator 24 is turned once again by the space of one slot n. This turning is done in the opposite direction to the turning shown in FIG. 5 so that on the other side of the winding form 38, the undercut surface 52 of the slot 50 of the other leg portion 40 is shifted over the winding wire 60 and fixes it on the base of the slot during the following swinging motion of the winding arm 56.

So that at high windings, that is, when the axial slots 30 are practically filled with winding wire, the winding wires 60 do not form an obstruction in the undercut slot 50 of the winding form 38, the winding form 38 can, if needed, be moved radially outward from the stator 24, or in the examples represented in the drawings, they can be moved upward.

The double arrow indicated in the drawings renders the machine capable of running for the automation of the winding process. The stator 24 is brought from below into the winding position over a vertical handling axis $H_1$. For the chucking of the stator 24 the take-up parts 18, 20 on the wiring apparatus 10 or the counterbearing 14 are driven over a second handling axis $H_2$ into the bore of the stator 24. Subsequently, an additional handling axis $H_3$ brings the winding form 38 over the stator 34.

Figure 9:
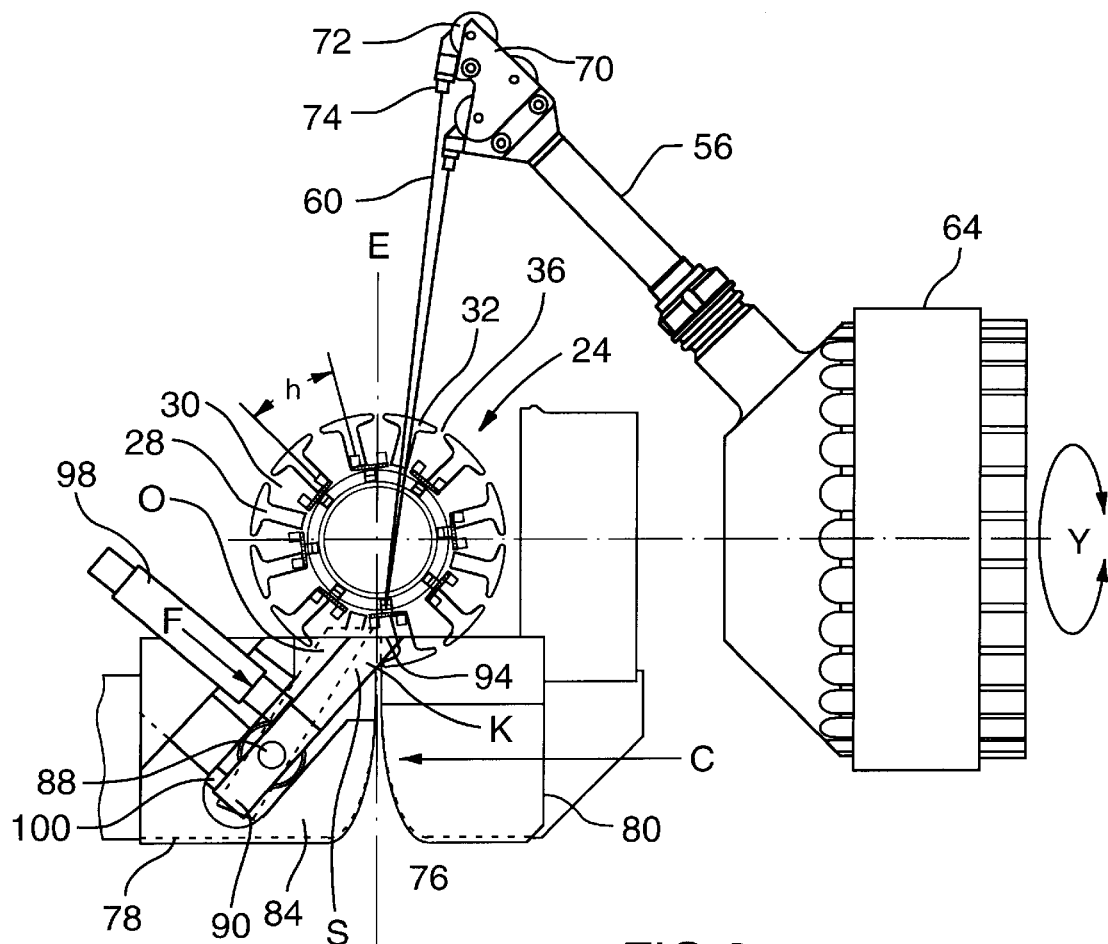
FIG. 9 is a plane view of a second form of embodiment of a winding machine.
Figure 10:
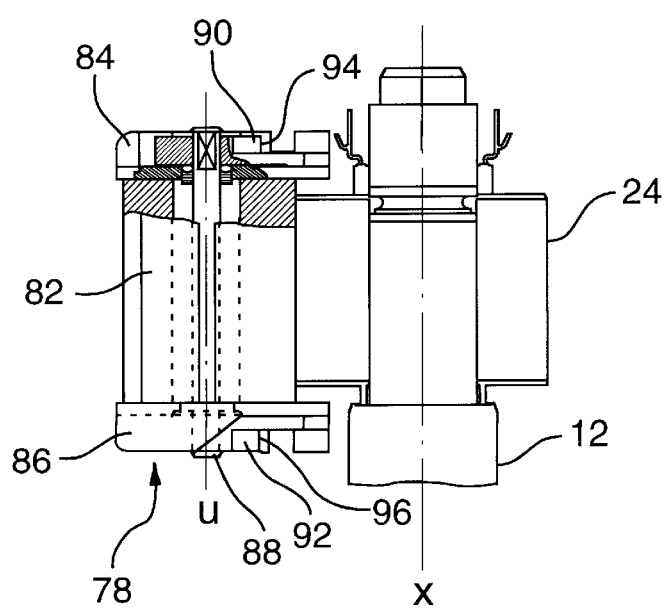
FIG. 10 is a partially cutoff lateral view of the arrangement from FIG. 9 viewed from direction c.

A second form of embodiment of a winding machine represented in FIGS. 9 and 10 is comparable in its essential parts to the first form of embodiment. For simplicity, comparable parts are thus labelled with the same reference numbers. The arrangement shown for the simultaneous laying of two winding wires 60 has a wire guide 70 rotatably positioned on the free end of the winding arm 56 with redirecting rollers 72 and wire-output openings 74 for the winding wires 60 guided via a central wire-guiding channel in the winding arm 56. A winding machine of this type with a rotatably positioned wire guide is the object of the Swiss Patent Application No. 0129/98.

Wire forms 78, 80, which are disposed with respect to one another so that between them a wire-guiding slit 76 is formed for the introduction of the winding wire 60 into the axial slots 30, serve as an aid to the laying of the winding wire 60.

The winding form 78 has an upper lateral part 84 and a lower lateral part 86. The two lateral parts 84, 86 are disposed via an intermediate piece 82 at a certain distance from one another.

A pin 88 is positioned in the winding form 78 rotatably about the axis u of the pin lying parallel to the axis of rotation x of the stator 24. At the two ends of the pin 88, an upper safety catch 90 as well as a lower safety catch 92 are disposed and rigidly connected to one another via the pin 88.

The ends 94, 96 of the safety catches 90, 92 pointing toward the stator 24, cut the plane E of the slit in their locked position S and thereby close, in cross section, the slot 30 to be wound. The safety catches 90, 92 are held by a pneumatic cylinder 98 laterally engaging the upper safety catch 90 during the swinging motion of the winding arm 56 between the two terminal positions A and B in the closed position S, whereby the free end of the upper safety catch 90 pointing away from the stator 24 laterally abuts a stop element 100 in the closed position S.

The function of the second form of embodiment of the apparatus according to the invention is explained in more detail in the following with the aid of FIG. 9.

By an initial swinging motion of the winding arm 56 from an initial terminal position A into a second terminal position B (see FIG. 8), the winding wire 60 is laid into an initial axial slot 30. With completely laid-in winding wire 60, that is, when the winding arm 56 is located in the second terminal position B, the safety catches 90, 92 are in their closed position S.

After the winding arm 56 has reached its second terminal position B, the stator 24 is turned by the space of one slot n. During the following swinging motion of the winding arm 56 from its second terminal position B back into the first terminal position A, the winding wire 60 is thus retained in the axial slot 30 by the two catch ends 94, 96 transverse to the plane E of the slit and only slips into the next axial slot 30 when the winding arm 56 has once again reached the first terminal position A.

The motion of the safety catches 90, 92 that is required for the laying of the winding wire 60 into the axial slot 30 from the closed position S into their open position O is done by the winding wire 60 itself shortly before the winding arm 56 reaches one of the two terminal positions A, B. In this way, the safety catches 90, 92 are swung about the axis of rotation u in the direction of the arrow K by the winding wire 60 guided in the plane E of the slit so that the wire can be laid into the axial slot 30 to be wound. As soon as the winding wire 60 has passed the ends 94, 96 of the safety catches 90, 92, said safety catches 90, 92 are spontaneously moved into their closed position S under the influence of the force F of the pneumatic cylinder 98.

What is claimed is:

1. Process for the winding of coils into a plurality of axial slots disposed on the outer perimeter of a rotatable, rotationally symmetrical body of an electrical device, whereby at least one wire, guided by a winding arm movable about an axis of rotation perpendicular to the axis of rotation of said body, is laid into said axial slots via a winding form, wherein said process comprises the steps of:

aligning an initial axial slot of said body with said winding form, said body being in a first position;

laying said wire in said initial axial slot accomplished by an initial swinging motion of said winding arm about its axis of rotation;

turning said body about its axis of rotation the space of at least one axial slot to a second position where said winding form is aligned with a second axial slot;

laying said wire into said second axial slot by a second swinging motion opposite to said initial swinging motion; and guiding said wire back to the start of said first axial slot after the laying into said second axial slot for the formation of a coil winding by turning of said body back to the first position.

2. Apparatus for the winding of coils into axial slots disposed on the outer perimeter of a rotationally symmetrical body of an electrical device, said apparatus comprising:

at least one winding arm for guiding of the wire; and at least one winding form as an aid for the laying of the wire to be laid in into said axial slots;

wherein said winding form has a wire-guiding slit with at least one retaining surface disposed transversely to the plane of the slit, which temporarily fixes said wire on a base of said axial slot during initial and second swinging motions of the winding arm.

3. Apparatus according to claim 2, wherein the wire-guiding slit of the winding form ends in an undercut slot, having at least one undercut surface which forms the at least one retaining surface.

4. Apparatus according to claim 3, wherein the winding form has a substantially U-shape cross section having a base part and two leg portions projecting out from said base part, and wherein the wire-guiding slit ends in said two leg portions, in each of said respective undercut slots.

5. Apparatus according to claim 4, wherein said base of said undercut slot forms an oblique surface extending and widening said undercut slot towards an outer side of said leg portions.

6. Apparatus according to claim 5, wherein said winding form is radially moveable with respect to said body, to enable said winding form to be moved away from said body when said laid wires substantially fill said axial slot in order to avoid said wires to form an obstruction in said undercut slot of said winding form.

7. Apparatus according to claim 4, wherein said winding form is radially moveable with respect to said body, to enable said winding form to be moved away from said body when said laid wires substantially fill said axial slot in order to avoid said wires to form an obstruction in said undercut slot of said winding form.

8. Apparatus according to claim 3, wherein said base of said undercut slot forms an oblique surface extending and widening said undercut slot towards an outer side of said leg portions.

9. Apparatus according to claim 8, wherein said winding form is radially moveable with respect to said body, to enable said winding form to be moved away from said body when said laid wires substantially fill said axial slot in order to avoid said wires to form an obstruction in said undercut slot of said winding form.

10. Apparatus according to claim 3, wherein said winding form is radially moveable with respect to said body, to enable said winding form to be moved away from said body when said laid wires substantially fill said axial slot in order to avoid said wires to form an obstruction in said undercut slot of said winding form.

11. Apparatus according to claim 2, wherein said winding form is radially moveable with respect to said body, to enable said winding form to be moved away from said body when said laid wires substantially fill said axial slot in order to avoid said wires to form an obstruction in said undercut slot of said winding form.

12. Apparatus for the winding of coils into axial slots disposed on the outer perimeter of a rotationally symmetrical body of electrical devices, said apparatus comprising:

at least one winding arm for guiding said wire; and winding forms as an aid for the laying of said wire to be laid in into said axial slots;

wherein said wire forms have a wire-guiding slit having a plane, and wherein two catching elements are arranged on both sides of said winding forms and are rigidly connected to one another, for retaining said wire in said axial slot during the swinging motion of said winding arm, whereby said catching elements can be brought, against the force of a spring element, into an open position by the wire to be laid into said axial slot during the laying process, and after successful laying in of said wire into said axial slot are spontaneously retractable by the force of said spring element into a closed position transverse to the plane of said slit.

13. Apparatus according to claim 12, wherein said catching elements are formed as safety catches rotatable about a common axis of rotation from the open position into the closed position.

14. Apparatus according to claim 13, wherein said safety catches are affixed at two ends of a pin rotatably positioned in one of said winding forms.

15. Apparatus according to claim 14, wherein said spring element is a pneumatic cylinder.

16. Apparatus according to claim 13, wherein said spring element is a pneumatic cylinder.

17. Apparatus according to claim 12, wherein said spring element is a pneumatic cylinder.

* * * * *

UNITED STATES PATENT AND TRADEMARK OFFICE
CERTIFICATE OF CORRECTION

PATENT NO.   : 6,036,135
DATED        : March 14, 2000
INVENTOR(S)  : Ulrich et al.

It is certified that error appears in the above-identified patent and that said Letters Patent is hereby corrected as shown below:

Column 6,
Line 58, 5. Apparatus according to claim 4, wherein said base of ...should read --
5. Apparatus according to claim 3, wherein said base of --

Column 6,
Line 62, 6. Apparatus according to claim 5, wherein said winding...should read --
6. Apparatus according to claim 4, wherein said winding --

Column 7,
Line 1, 7. Apparatus according to claim 4, wherein said winding...should read --
7. Apparatus according to claim 3, wherein said winding --

Column 7,
Line 17, 10. Apparatus according to claim 3, wherein said winding...should read --
10. Apparatus according to claim 5, wherein said winding --

Signed and Sealed this

Thirteenth Day of November, 2001

*Attest:*

NICHOLAS P. GODICI
*Attesting Officer*    Acting Director of the United States Patent and Trademark Office